United States Patent
Tokuyama et al.

Patent Number: 6,055,648
Date of Patent: Apr. 25, 2000

[54] METHOD AND APPARATUS FOR RECOVERING THE COMPUTING ERROR, AND A COMPUTER-READABLE RECORDING MEDIUM FOR STORING THE PROGRAM FOR EXECUTING THE METHOD

[75] Inventors: Takaki Tokuyama; Motohide Tamura, both of Tokushima, Japan

[73] Assignee: Justsystem Corp., Tokushima, Japan

[21] Appl. No.: 08/975,282

[22] Filed: Nov. 20, 1997

[30] Foreign Application Priority Data

Jun. 3, 1997 [JP] Japan .................................... 9-145017

[51] Int. Cl.[7] .................................................. G06F 11/00
[52] U.S. Cl. .......................... 714/16; 707/503; 708/204
[58] Field of Search .................................. 714/16, 15, 1, 714/38; 712/222; 708/204; 707/503, 504

[56] References Cited

U.S. PATENT DOCUMENTS

| Re. 33,629 | 7/1991 | Palmer et al. | |
|---|---|---|---|
| 5,506,797 | 4/1996 | Koshiba | 708/204 |
| 5,561,615 | 10/1996 | Kuo et al. | 708/204 |
| 5,600,584 | 2/1997 | Schlafly | 714/38 |
| 5,717,939 | 2/1998 | Bricklin et al. | 707/503 |
| 5,742,835 | 4/1998 | Kaethler | 707/503 |
| 5,819,293 | 10/1998 | Comer et al. | 707/503 |
| 5,842,180 | 11/1998 | Khanna et al. | 707/504 |

FOREIGN PATENT DOCUMENTS

| 56-129946 | 10/1981 | Japan . |
|---|---|---|
| 62-187933 | 8/1987 | Japan . |
| 62-191926 | 8/1987 | Japan . |
| 63-310019 | 12/1988 | Japan . |
| 64-18344 | 1/1989 | Japan . |
| 64-54528 | 3/1989 | Japan . |
| 1-23806 | 5/1989 | Japan . |
| 2-16632 | 1/1990 | Japan . |
| 2-224021 | 9/1990 | Japan . |
| 3-176730 | 7/1991 | Japan . |
| 3-53650 | 8/1991 | Japan . |
| 3-57487 | 9/1991 | Japan . |
| 4-5727 | 1/1992 | Japan . |
| 4-29092 | 5/1992 | Japan . |
| 4-281524 | 10/1992 | Japan . |
| 5-274116 | 10/1993 | Japan . |

*Primary Examiner*—Robert W. Beausoliel, Jr.
*Assistant Examiner*—Christopher A. Revak
*Attorney, Agent, or Firm*—McDermott, Will & Emery

[57] ABSTRACT

The floating point data stored in an arbitrary cell is processed on the basis of a particular formula (S401), if an error due to column truncation occurs in a result of computation (S402) then the all the floating point data is converted to the fixed point data (S405), and the error occurring due to the floating point data is recovered automatically thereby improving the convenience of the recovery process.

9 Claims, 6 Drawing Sheets

| | A | B | C | D | | | |
|---|---|---|---|---|---|---|---|
| 1 | FLOATING A1 | FLOATING B1 | A1*B1 | | | | ... |
| 2 | FLOATING A2 | FLOATING B2 | | | | | ... |
| 3 | FLOATING A3 | FLOATING B3 | | | | | ... |
| 4 | | | | | | | ... |
| 5 | | | | | | | ... |
| 6 | | | | | | | ... |
| ... | | | | | | | |

|   | A | B | C | D |
|---|---|---|---|---|
| 1 | FIXED A1 | FIXED B1 | FIXED A1*B1 | |
| 2 | FLOATING A2 | FLOATING B2 | | |
| 3 | FLOATING A3 | FLOATING B3 | | |
| 4 | | | | |
| 5 | | | | |
| 6 | | | | |
| ... | | | | |

FIG.6

|   | A | B | C | D |   |
|---|---|---|---|---|---|
| 1 | FIXED A1 | FIXED B1 | FIXED A1*B1 |   | ... |
| 2 | FIXED A2 | FIXED B2 |   |   | ... |
| 3 | FIXED A3 | FIXED B3 |   |   | ... |
| 4 |   |   |   |   | ... |
| 5 |   |   |   |   | ... |
| 6 |   |   |   |   | ... |
| ... |   |   |   |   |   |

METHOD AND APPARATUS FOR RECOVERING THE COMPUTING ERROR, AND A COMPUTER-READABLE RECORDING MEDIUM FOR STORING THE PROGRAM FOR EXECUTING THE METHOD

FIELD OF THE INVENTION

The present invention relates to a method for recovering the computing error which can automatically recover a computing error due to column truncation occurring when specified computing is performed by referring to floating point data in spreadsheet software, an apparatus for the same, and a computer-readable recording medium for storing program that executes said method.

BACKGROUND OF THE INVENTION

Two types of computing methods, namely the floating point arithmetic and fixed point arithmetic are available in spreadsheet software. While computing, the floating point arithmetic is generally performed because the computing speed is faster as compared to the other type of arithmetic. If any column truncation occurs in the result of computing, the user switches to the fixed point arithmetic, whereby recovering the computing error that had occurred because the floating point arithmetic was executed.

In the conventional technology as described above, because the user manually switches the computing mode to the fixed point arithmetic and re-computes if a computing error due to column truncation is generated in a result of computing based on the floating point arithmetic, the recovery processing is rather inefficient and not convenient.

Also, in a case where a user switches the computing mode to the fixed point arithmetic fearing occurrence of column truncation error even if no computing error has been generated in the floating point arithmetic, the computing speed becomes disadvantageously lower.

SUMMARY OF THE INVENTION

It is an object of the present invention to improve convenience in the recovery processing by enabling automatic recovery from a computing error due to column truncation when computing based on the floating point arithmetic is performed with spreadsheet software.

The method for recovering the computing error according to the present invention comprises a step of converting the floating point data referred to during the computing to fixed point data, in case a column truncation error occurs in a result of computing when specified computing is executed by referring to floating point data, and a step of performing re-computing using the fixed point data, whereby recovering the computing error due to column truncation generated when the floating point arithmetic is executed.

The method for recovering the computing error according to the present invention comprises a step of converting all the floating point data to the fixed point data, in a case where both floating point data and fixed point data happen to be present in a spreadsheet as a result of converting the floating point data to the fixed point data in the above converting step.

The apparatus for recovering a computing error according to the present invention converts the floating point data referred to during the computing to fixed point data, in case a column truncation error occurs in a result of computing when specified computing is executed by referring to floating point data, and a step of performing re-computing using the fixed point data, whereby recovering the computing error due to column truncation generated when the floating point arithmetic is executed.

The computer-readable recording medium for storing program that executes said method according to the present invention, makes a computer execute the program stored therein, so that, in a case where any column truncation error occurs in a result of computing, the floating point data used for computing is converted to fixed point data, and re-computing is executed using the fixed point data, whereby recovery from the computing error due to column truncation in the floating point arithmetic is executed.

Other objects and features of this invention will become clear from the following description with reference to the accompanying drawings.

DESCRIPTION OF THE PREFERRED EMBODIMENTS

Detailed description is made hereinafter for a method and apparatus for recovering the computing error, and a computer-readable recording medium for storing the program for executing the method each according to the present invention with reference to the related drawings.

Figure 1:
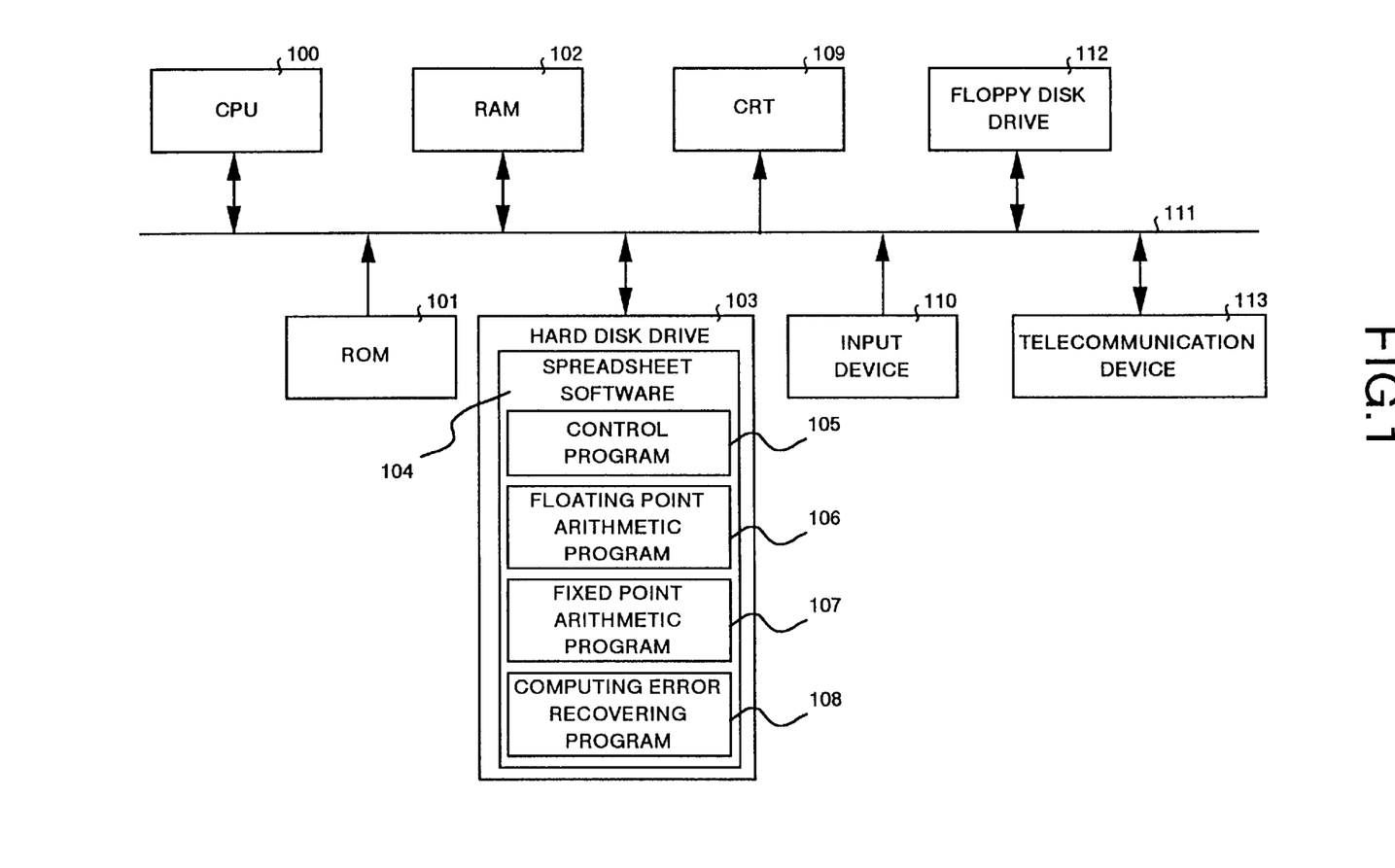
FIG. 1 is a block diagram showing hardware configuration for realizing the method for recovering the computing error according to the present invention.

FIG. 1 is a block diagram showing hardware configuration for realizing the method for recovering the computing error according to the present invention using a personal computer or the like. In FIG. 1, designated at the reference numeral 100 is a CPU, at 101 is a ROM storing therein a control program of the CPU 100, at 102 is a RAM used as a work area or the like of the CPU 100, at 103 is a hard disk drive storing therein spreadsheet software 104 or the like, at 109 is a CRT displaying thereon a spreadsheet or the like of a spreadsheet program, at 110 is an input device such as a keyboard and a mouse for inputting numerical values and characters or the like therethrough, and at 111 is a bus for connecting therethrough the components to each other respectively. In addition to the above components, a floppy disk drive 112, a telecommunication device 113 such as a modem, and a CD-ROM drive or the like may be connected thereto if necessary.

The spreadsheet software 104 stored in the hard disk drive 103 is an application programs for computing and management of various data in a tabular form as well as for processing the table, and includes a control program 105 for controlling execution of each processing according to the spreadsheet software 104, a floating point arithmetic program 106 for executing a specified computing process based on floating point data, a fixed point arithmetic program 107 for executing a specified computing process based on fixed point data, and a computing error recovering program 108 for executing a recovery process using the method for recovering the computing error according to the present invention in a case where any error occurs in a result of computing based on the floating point arithmetic.

Herein, computing based on the floating point arithmetic with the floating point arithmetic program 106 is executed, for instance, using a floating point unit in the CPU 100. In the floating point arithmetic, number of significant digits in a computable numerical value is generally set to 15 digits, which requires, for instance, a 8-byte data area for computing.

Also, in computing based on the fixed point arithmetic with the fixed point arithmetic program 107, number of significant digits in a computable numerical value is generally set to 38 digits, which requires, for instance, a 20-byte data area for computing.

The floating point arithmetic has an advantage in that the computing speed is faster than that in the fixed point arithmetic. On the other hand, in the fixed point arithmetic, the computing speed is slower and a large amount of data area is required, but it has an advantage in that larger number of significant digits in a numerical value is allowable as compared to that in the floating point arithmetic.

In a case where computing for the below expression is executed in the floating point arithmetic:

$$0.1234567890123456 + 0.1$$

the result of the computing is as follows:

$$0.2234567890123456$$

in which the number "6" in the last digit, namely a value in the digit exceeding the significant digits of 15 is not compensated for (generation of column truncation), but in a case where computing is executed based on the fixed point arithmetic, numerical values with a the number of significant digits of 38 can be handled, so that the above numerical value can be accurately computed without generation of any error due to column truncation.

For this reason, in the present embodiment, computing is basically performed in the floating point arithmetic because the computing speed is faster, and in a case where any error due to column truncation occurs in the floating point arithmetic, the arithmetic is automatically switched to the fixed point arithmetic to execute computing therewith again, whereby recovery processing from a computing error due to column truncation can be executed.

It should be noted that, in a case where computing based on numerical values exceeding the number of significant digits in the floating point arithmetic is instructed, the computing may be executed by previously switching the computing mode to the fixed point arithmetic in anticipation of generation of any error due to column truncation.

Also, determination can be made as to whether any error due to column truncation has occurred or not by checking whether a flag indicating generation of column truncation has been set in a flag resistor in the CPU 100 or not.

It is not that the floating point data and fixed point data are different from each other in numerical values themselves, but that the way in which the data is stored is different.

Furthermore, instead of recording the programs described above in the hard disk 103 they can be recorded in a computer-readable recording medium such as a floppy desk, a CD-ROM, or a DVD or the like, and the program can be read out from each of these medium and a computer can be made to execute it. Also, each of the programs can be separately recorded in each of the recording media, which can be distributed to users if necessary, and also it is possible to execute transaction of each program through a network or the like. Configuration of the spreadsheet program 104 is not limited to the configuration described above, and any arbitrary modification may be made thereto.

Figure 2:
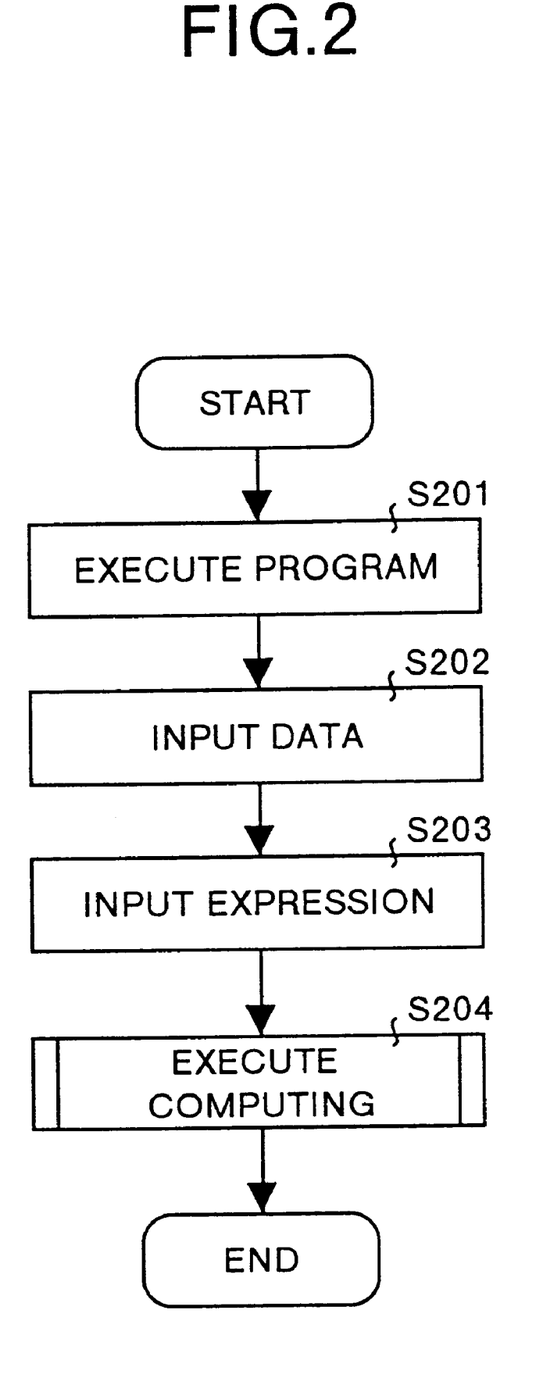
FIG. 2 is a flow chart for explaining computing processing according to the method of the present embodiment when used in the spreadsheet software.

Hereafter a concrete description is made of the method for recovering the computing error according to the embodiment by describing the computing process with the spreadsheet software 104. FIG. 2 is a flow chart for explaining the computing process according to the spreadsheet software 104.

When a command to start the spreadsheet software 104 is inputted from the input device 110, the control program 105 is read out into the RAM 102 by the CPU 100, and execution of the spreadsheet software 104 is started (S201). The control program 105 occupies, when having been read out by the CPU 100, a work area in the RAM 102 and also displays the spreadsheet on the CRT 109. Stored in the work area in the RAM 102 are cell data for spreadsheet, information indicating from which position in the memory each row or each column starts, and various information or the like for cells which is not included in the cell data itself.

Figure 3:
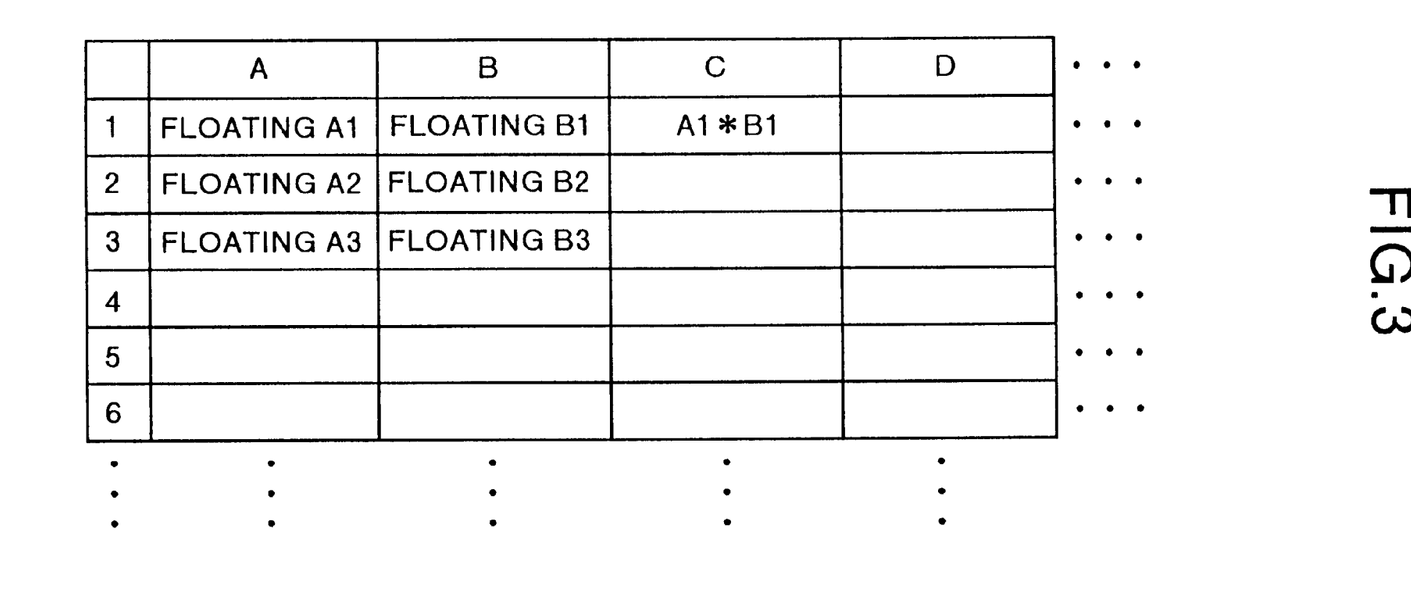
FIG. 3 is an explanatory view showing a state in which data is inputted in each cell of the spreadsheet.

Then the control program 105 stores, after receiving the numerical value data from the input device 110, the inputted numerical value data in each corresponding address in the work area, and also displays the numerical value data in each corresponding cell in the spreadsheet displayed on the screen (S202). FIG. 3 shows a state in which the numerical value data is inputted in each cell. The spreadsheet software 104 in the present embodiment is designed so as to generally execute the floating point arithmetic in order to improve the computing speed, and each numerical value data to be stored in each cell is designed so as to be stored therein in a form of floating point data.

Then, when a formula for computing is inputted from the input device 110, the formula is stored in the corresponding address in the work area (S203). Herein, it is assumed that a formula for obtaining a product of the data in cells A1 and B1 and the result is inputted in the cell C1. It should be noted that, although it is assumed in description of present embodiment that the numerical value data is inputted and then the formula for computing is inputted, however, numerical value data may be inputted after inputting the formula.

Figure 4:
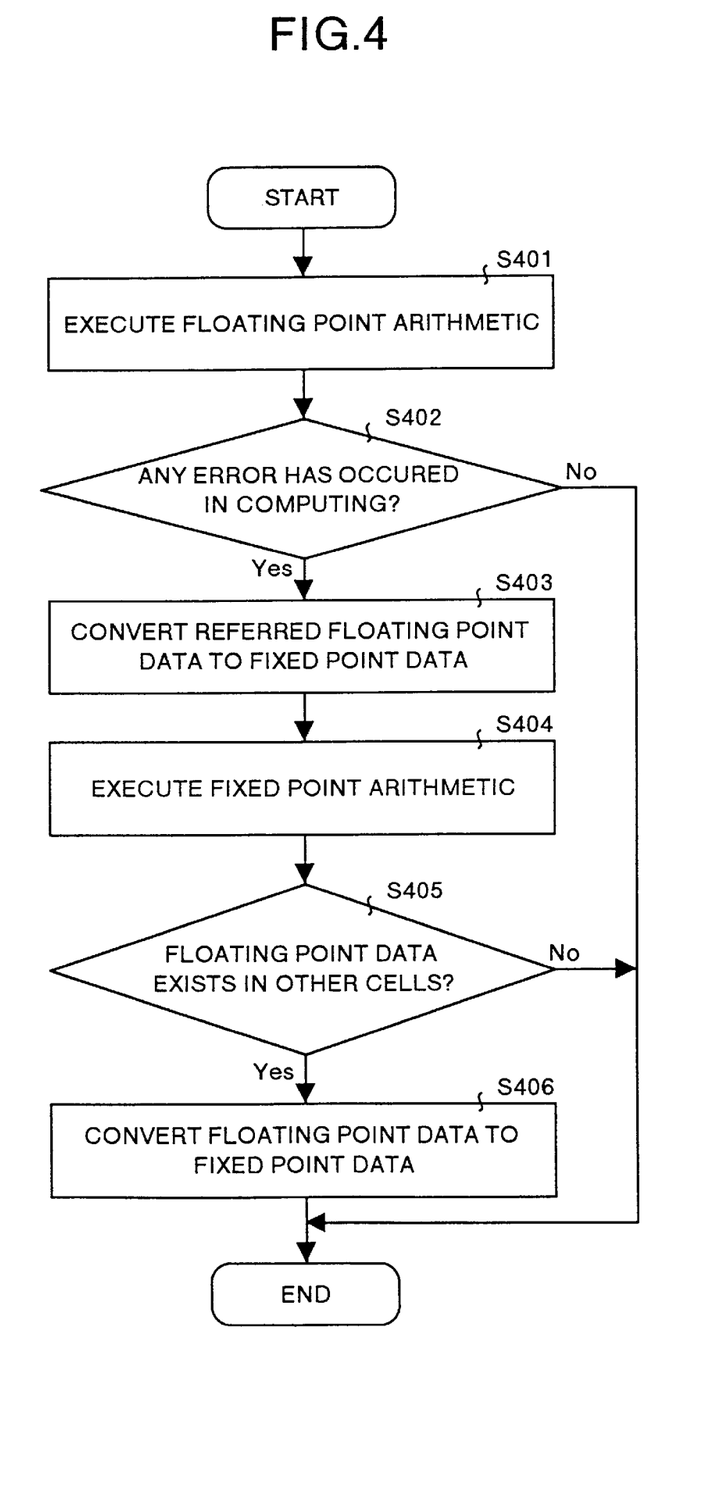
FIG. 4 is a flow chart for explaining the computing error recovering method according to the present embodiment.

The control program 105 starts when the above mentioned formula is inputted and executes the floating point arithmetic program 106 and executes computing (S204). Herein, detailed description is made for computing in the step S204 with reference to FIG. 4. It should be noted that FIG. 4 shows a flow chart for explaining the computing error recovering method according to the present embodiment, and in a case where any computing error (due to column truncation) occurs in execution of computing in step the S204, the method for recovering the computing error according to the present embodiment is executed.

The floating point arithmetic program 106 refers to the numerical value data, namely the floating point data, of the corresponding cells (A1 and B1), and executes the floating point arithmetic (the product of A1 and B1) (S401) on the basis of the inputted formula.

Then, after execution of computing, the floating point program 106 determines whether any error due to column truncation has occurred in the result of computing or not (S402). Specifically, the floating point arithmetic program 106 checks for a flag of the CPU 100 and determines whether the error due to column truncation has occurred or not based on the result.

In a case where it is determined in the step S402 that the error due to column truncation has not occurred, the floating point arithmetic program 106 displays the result of computing in the corresponding cell (C1) and terminates the computing.

On the other hand, in a case where it is determined in the step S402 that the error due to column truncation has occurred, the floating point arithmetic program 106 passes the result of determination to the control program 105, and the control program 105 calls the computing error recovering program 108 and executes the program to recover the computing error (S403 to S406). The control program 105 allocates memory to a work area for recovery processing from computing error namely to a data area required for executing fixed point arithmetic.

The computing error recovering program 108 converts the floating point data referred to at the time of computing in step S401 to the fixed point data (S403) when having been called by the control program 105.

Figure 5:
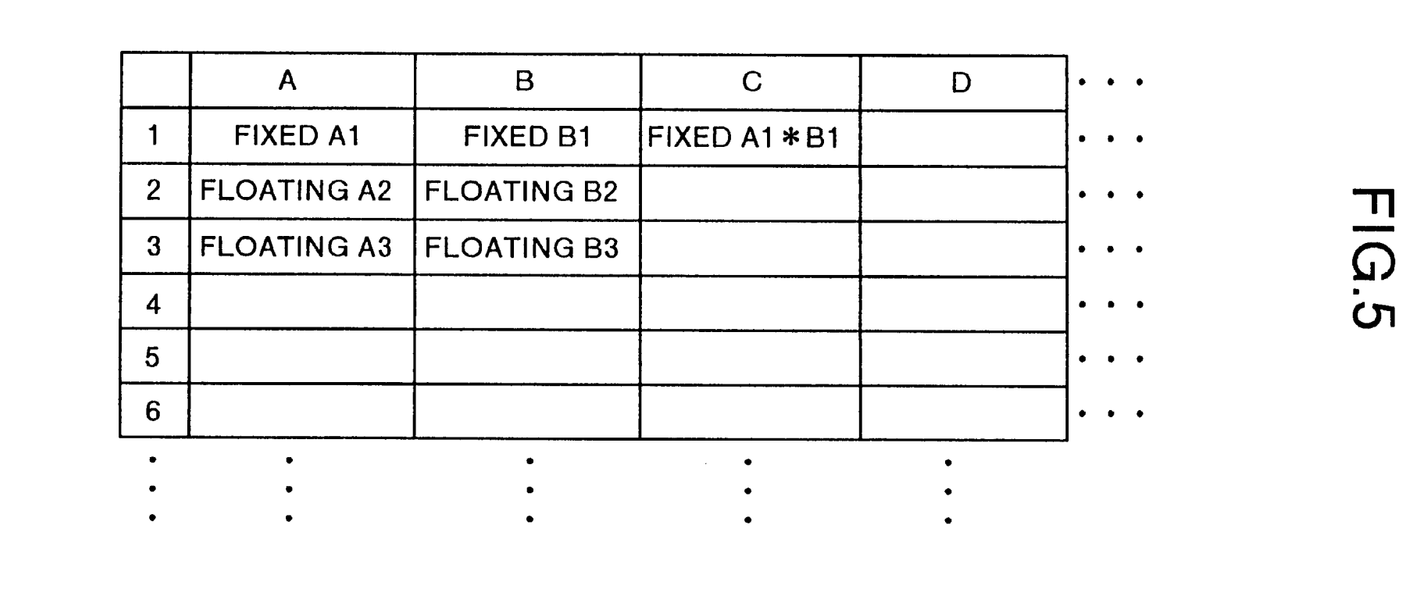
FIG. 5 is an explanatory view showing a state of the spreadsheet on which a result of fixed point arithmetic is displayed.

Then, the computing error recovering program 108 calls the fixed point arithmetic program 107 and makes the program execute the fixed point arithmetic by referring to the fixed point data converted thereto (S404) when the conversion to the fixed point data has ended. The fixed point arithmetic program 107 executes the fixed point arithmetic by referring to the fixed point data converted thereto according to the formula and displays the result in the corresponding cell (C1). FIG. 5 shows a state of a spreadsheet on which a result of the fixed point arithmetic is displayed.

Then, the computing error recovering program 108 makes determines as to whether floating point data has been stored in cells other than the cells referred to at the time of the computing or not (S405). If floating point data has not been stored in cells other than the cells referred to, the computing is terminated.

On the other hand, if floating point data has been stored in cells other than the cells referred to, all of the floating point data is converted to the fixed point data (S406).

Figure 6:
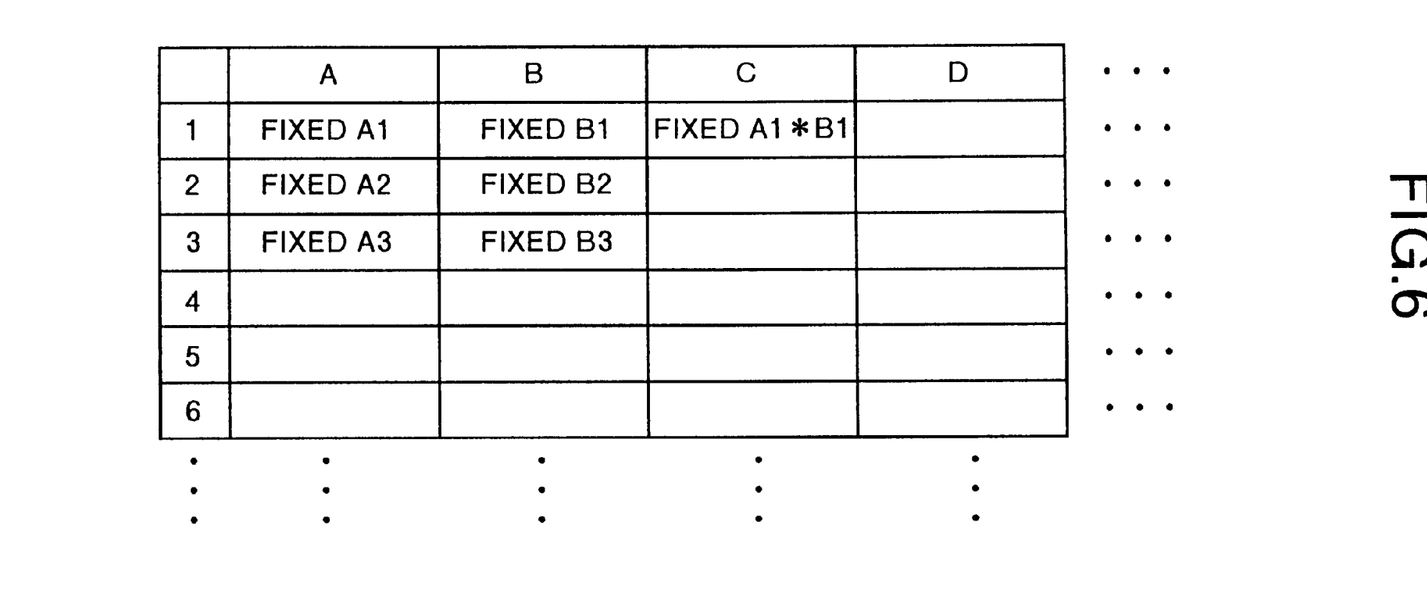
FIG. 6 is an explanatory view showing a state of display of fixed point data converted from all of the floating point data in the spreadsheet.

In the step S406 the floating point data is converted to fixed point data because the floating point data referred to has been converted to fixed point data in the earlier step S403. Because numerical-value data for each cell has been stored in the work area in the form of floating point data, when the floating point data is converted to fixed point data, data having different forms such as floating point data and fixed point data exist together in the spreadsheet. If computing is executed using a data having different forms, an error may occur in a result of computing, so that forms of the data for numerical values in the whole spreadsheet are unified to prevent occurrence of any computing error. It should be noted that FIG. 6 shows a state of display of fixed point data converted from all of the floating point data in the spreadsheet.

As described above, with the method and apparatus for recovering the computing error according to the present embodiment, floating point arithmetic is generally executed using floating point data, and in a case where any error due to column truncation occurs in a result of computing, the floating point data is converted to fixed point data, and fixed point arithmetic is executed using the fixed point data converted thereto, whereby it is possible to automatically recover the computing error and to obtain accurate result of computing. Accordingly, it is possible to improve convenience in recovery processing required when any computing error due to column truncation has occurred.

In a case where floating point data and fixed point data are present in a spreadsheet as a result of the conversion of the floating point data referred to at the time of computing to the fixed point data, the floating point data is converted to the fixed point data, whereby it is possible to prevent any computing error occurring due to different data forms in the spreadsheet before it occurs.

As described above, the method for recovering the computing error according to the present invention (claim 1) comprises a converting step of converting the referred floating point data to fixed point data, in a case where an error of cancellation of significant digits occurs in a result of computing when specified computing is executed by referring to floating point data, and a re-computing step of executing re-computing by referring to the fixed point data converted thereto in the converting step, whereby it is possible to improve convenience in recovery processing required when any computing error due to column truncation has occurred in a result of computing.

The method for recovering the computing error according to the present invention comprises, in addition to the steps mentioned the above invention, a step of converting all of the floating point data to the fixed point data, in a case where floating point data is stored in each cell other than the cells in which the fixed point data referred to in the re-computing step after the re-computing step is executed, whereby it is possible to prevent any computing error occurring due to different data forms in the spreadsheet before it occurs.

The apparatus for recovering the computing error according to the present invention comprise a converting means for converting the referred floating point data to fixed point data, in a case where an error due to column truncation occurs in a result of computing when specified computing is executed by referring to floating point data, and a re-computing means for executing re-computing by referring to the fixed point data converted thereto in the converting means, whereby it is possible to improve convenience in recovery processing required when any computing error due to column truncation has occurred in a result of computing.

The computer-readable recording medium according to the present invention stores a program for making a computer execute each step of the method of recovering the computing error according to the above invention, so that, by making a computer execute the program, it is possible to improve convenience in recovery processing required when any computing error due to column truncation has occurred in a result of computing.

This application is based on Japanese patent application No. HEI 9-145017 filed in the Japanese Patent Office on Jun. 3, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method for recovering the computing error comprising:
   a computing step, wherein specified computing is executed by referring to floating point data stored in arbitrary cells of a spreadsheet;
   a first converting step, wherein the referred floating point data is converted to fixed point data in a case where an error due to column truncation occurs in a result of computing when the specified computing is executed by referring to said floating point data; and a re-computing step, wherein the computing is executed again by referring to the fixed point data converted thereto in said first converting step.

2. A method for recovering the computing error according to claim 1 further comprising:

a second converting step, wherein all of said floating point data is converted to fixed point data in a case where floating point data is stored in a cell other than the cell storing therein the fixed point data referred to in said re-computing step after said re-computing step is executed.

3. An apparatus for recovering the computing error comprising:

a computing means for executing specified computing by referring to floating point data stored in arbitrary cells of a spreadsheet;

a converting means for converting said referred floating point data to fixed point data in a case where an error due to column truncation occurs in a result of computing when the specified computing is executed by referring to said floating point data; and a re-computing means for executing computing again by referring to the fixed point data converted thereto by said converting means.

4. A computer-readable recording medium with a program stored therein for making a computer execute each step in the computing error recovering method according to claim 1.

5. A method for recovering a computing error, comprising:

executing a specified computing based on floating point data stored in one or more cells of a spreadsheet;

determining whether an error occurred in said executing the specified computing; and in response to determining that an error occurred, converting the floating point data into fixed point data and re-computing the specified computing based on the fixed point data.

6. The method of claim 5, wherein the error is a column truncation error.

7. The method of claim 6, further comprising converting floating point data stored in a cell other said one or more cells into fixed point data after said re-computing.

8. An apparatus for recovering a computing error, comprising:

a computing means for executing a specified computing based on floating point data stored in one or more cells of a spreadsheet;

a checking means for determining whether an error occurred in said executing the specified computing;

a converting means, in response to the checking means if the error occurred, for converting the floating point data into fixed point data; and a re-computing means for re-computing the specified computing based on the fixed point data.

9. A computer-readable recording medium with a program stored therein for making a computer execute the steps of:

executing a specified computing based on floating point data stored in one or more cells of a spreadsheet;

determining whether an error occurred in said executing the specified computing; and in response to determining that an error occurred, converting the floating point data into fixed point data and re-computing the specified computing based on the fixed point data.

* * * * *